(12) United States Patent
Schmidt et al.

(10) Patent No.: US 11,192,794 B2
(45) Date of Patent: Dec. 7, 2021

(54) PRODUCTION OF PULVERULENT, POROUS CRYSTALLINE METAL SILICATES BY MEANS OF FLAME SPRAY PYROLYSIS

(71) Applicant: EVONIK OPERATIONS GMBH, Essen (DE)

(72) Inventors: Franz Schmidt, Frankfurt (DE); Johan Anton, Dorsten (DE); Matthias Pascaly, Münster (DE); Andrea Heinroth, Frankfurt (DE); Stefan Wieland, Hanau (DE); Heiko Morell, Rodgau (DE); Peter Kress, Karlstein (DE); Michael Hagemann, Shanghai (CN)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/770,593

(22) PCT Filed: Nov. 23, 2018

(86) PCT No.: PCT/EP2018/082304
§ 371 (c)(1),
(2) Date: Jun. 6, 2020

(87) PCT Pub. No.: WO2019/110322
PCT Pub. Date: Jun. 13, 2019

(65) Prior Publication Data
US 2021/0163304 A1    Jun. 3, 2021

(30) Foreign Application Priority Data

Dec. 7, 2017 (DE) .................................. 17205799.4

(51) Int. Cl.
| | | |
|---|---|---|
| C01B 39/02 | (2006.01) | |
| C01B 33/20 | (2006.01) | |
| C01B 39/20 | (2006.01) | |
| C01B 39/46 | (2006.01) | |
| C01B 39/14 | (2006.01) | |
| C01B 39/26 | (2006.01) | |
| C01B 39/38 | (2006.01) | |

(52) U.S. Cl.
CPC ............ *C01B 39/026* (2013.01); *C01B 33/20* (2013.01); *C01B 39/02* (2013.01); *C01B 39/14* (2013.01); *C01B 39/20* (2013.01); *C01B 39/26* (2013.01); *C01B 39/38* (2013.01); *C01B 39/46* (2013.01); *C01P 2002/72* (2013.01); *C01P 2006/12* (2013.01)

(58) Field of Classification Search
CPC ....... C01B 33/20; C01B 39/02; C01B 39/026; C01B 39/14; C01B 39/20; C01B 39/26; C01B 39/38; C01B 39/46; C01P 2002/72; C01P 2006/12

See application file for complete search history.

(56) References Cited

U.S. PATENT DOCUMENTS

| | | |
|---|---|---|
| 4,410,501 A | 10/1983 | Taramasso et al. |
| 5,919,430 A | 7/1999 | Hasenzahl et al. |
| 5,958,361 A | 9/1999 | Laine et al. |
| 6,106,803 A | 8/2000 | Hasenzahl et al. |
| 6,613,300 B2 | 9/2003 | Mangold |
| 7,510,693 B2 | 3/2009 | Katusic |
| 8,277,765 B2 | 10/2012 | Dietz et al. |
| 8,545,673 B2 | 10/2013 | Dietz et al. |
| 9,748,567 B2 | 8/2017 | Eihassid |
| 10,280,088 B2 | 5/2019 | Schulze Isfort et al. |
| 10,384,940 B2 | 8/2019 | Katusic et al. |
| 2001/0036437 A1 | 11/2001 | Gutsch |
| 2002/0041963 A1 | 4/2002 | Konya et al. |
| 2005/0069506 A1 | 3/2005 | Katusic |
| 2005/0100666 A1 | 5/2005 | Hampden-Smith |
| 2007/0231280 A1 | 10/2007 | Schumacher et al. |
| 2009/0131694 A1 | 5/2009 | Schumacher et al. |
| 2010/0102700 A1 | 4/2010 | Jaiswal et al. |
| 2011/0171120 A1 | 7/2011 | Lortz et al. |
| 2011/0236288 A1 | 9/2011 | Panz et al. |
| 2013/0045158 A1 | 2/2013 | Katusic |
| 2014/0301942 A1 | 10/2014 | Hasenzahl et al. |
| 2017/0253547 A1 | 9/2017 | Corre et al. |
| 2017/0275166 A1 | 9/2017 | Katusic |
| 2017/0338487 A1 | 11/2017 | Katusic |

(Continued)

FOREIGN PATENT DOCUMENTS

| | | |
|---|---|---|
| CN | 1482062 | 3/2004 |
| CN | 101348263 | 1/2009 |

(Continued)

OTHER PUBLICATIONS

Siriworarat et al, "Production of methanol from carbon dioxide using palladium-copper-zinc loaded on MCM-41: Comparison of catalysts synthesized from flame spray pyrolysis and sol-gel method using silica source from ricehusk ash", Journal of Cleaner Production 142 (2017) 1234-1243 (Year: 2017).*

(Continued)

*Primary Examiner* — David M Brunsman
(74) *Attorney, Agent, or Firm* — Law Office of: Michael A. Sanzo, LLC

(57) ABSTRACT

The present invention relates to a process for preparing a pulverulent, porous crystalline metal silicate, comprising the following steps:
a) hydrothermal synthesis in an aqueous mixture comprising (A) at least one silicon source, (B) at least one metal source and (C) at least one mineralizer to obtain an aqueous suspension comprising a porous crystalline metal silicate as reaction product; and
b) calcination of the reaction product, characterized in that the calcination is conducted by means of flame spray pyrolysis at an adiabatic combustion temperature within a range of 450-2200° C., wherein the suspension having a solids content of 70% by weight which is obtained in step a) is sprayed into a flame generated by combustion of a fuel in the presence of oxygen to form a pulverulent, porous crystalline metal silicate.

20 Claims, 2 Drawing Sheets

(56) References Cited

U.S. PATENT DOCUMENTS

| | | | |
|---|---|---|---|
| 2019/0352189 A1 | 11/2019 | Kress et al. | |
| 2020/0140282 A1 | 5/2020 | Erz et al. | |
| 2020/0230703 A1 | 7/2020 | Katusic | |
| 2020/0231438 A1 | 7/2020 | Schimek et al. | |

FOREIGN PATENT DOCUMENTS

| | | |
|---|---|---|
| DE | 36 02 066 | 7/1987 |
| DE | 100 61 016 | 7/2002 |
| DE | 10 2015 104 653 | 9/2016 |
| EP | 0 306 018 | 3/1989 |
| EP | 0 471 139 | 2/1992 |
| EP | 0 814 058 | 12/1997 |
| EP | 1 138 632 | 10/2001 |
| EP | 1 142 830 | 10/2001 |
| EP | 2 944 611 | 11/2015 |
| WO | WO 99/06331 | 2/1999 |
| WO | WO 2004/048261 | 6/2004 |
| WO | WO 2009/059900 | 5/2009 |
| WO | WO 2011/005631 | 1/2011 |
| WO | WO 2016/169842 | 10/2016 |
| WO | WO 2018/024661 | 2/2018 |
| WO | WO 2018/201054 | 11/2018 |
| WO | WO 2020/064401 | 4/2020 |

OTHER PUBLICATIONS

Tani et al., "Synthesis of zinc oxide/silica composite nanoparticles by flame spray pyrolysis", Journal of Materials Science 3 7 (2 0 0 2 ) 4627-4632 (Year: 2002).*

English language translation of the International Search Report for international application, PCT/EP2019/074707 filed Sep. 16, 2019; corresponding to copending U.S. Appl. No. 17/279,061.

English language translation of the Written Opinion of the International Searching Authority for international application, PCT/EP2019/074707 filed Sep. 16, 2019; corresponding to copending U.S. Appl. No. 17/279,061.

English language translation of the International Preliminary Report on Patentability for international application, PCT/EP2019/074707 filed Sep. 16, 2019; corresponding to copending U.S. Appl. No. 17/279,061.

English language translation of the International Search Report for corresponding international application, PCT/EP2018/082304 filed Nov. 23, 2018.

English language translation of the Written Opinion of the International Searching Authority for corresponding international application, PCT/EP2018/082304 filed Nov. 23, 2018.

English language translation of the International Preliminary Report on Patentability for corresponding international application, PCT/EP2018/082304 filed Nov. 23, 2018.

Barrett, et al., "The Determination of Pore Volume and Area Distributions in Porus Substances. I. Computations from Nitrogen Isotherms," *Journal of the American Chemical Society* 73(1):373-380 (Jan. 1951).

Lamberti, et al., "Structural Characterization of Ti-Silicate-1: A Synchrotron Radiation X-Ray Powder Diffraction Study," *Journal of Catalysis* 183(2):222 (Apr. 1999).

Li, et al., "Flame aerosol synthesis of nanostructured materials and functional devices: Processing, modeling and diagnostics," *Progress in Energy and Combustion Science* 55:1-59 (May 2016).

Mädler, et al., "Flame-made ceria nanoparticles," *J. Mater. Res.* 17(6):1356-1362 (Jan. 2002).

Mädler, et al., "Controlled synthesis of nanostructured particles by spray pyrolysis," *Aerosol Science* 33(2):369-389 (Jan. 2002).

Wang, et al., "Ferroelectric $WO_3$ Nanoparticles for Acetone Selective Detection," *Chem. Mater.* 20:4794-4796 (Jan. 2008) with Supporting Information: Synthesis and Characterization Methods, pp. 1-5 attached (from Madler, et al. above).

Wegner, et al., "Scale-up of nanoparticle synthesis in diffusion flame reactors," *Chemical Engineering Science* 58:4581-4589 (Oct. 2003).

U.S. Appl. No. 16/476,274, filed Jul. 6, 2019, US-2019/0352189 A1, Nov. 21, 2019, Kress.

U.S. Appl. No. 16/072,467, filed Jul. 24, 2018, Katusic.

U.S. Appl. No. 16/628,664, filed Jan. 4, 2020, US-2020/0140282 A1, May 7, 2020, Erz.

Response to Office Action for copending U.S. Appl. No. 16/072,467, filed Dec. 1, 2020.

Final Office Action for copending U.S. Appl. No. 16/072,467, dated Mar. 2, 2021.

Liu, et al., "Study on the Calcination of Titanium Silicalite Zeolie (TS-1)," *Advanced Materials Research* 287-290:317-321 (2011).

U.S. Appl. No. 17/279,061, filed Mar. 23, 2021, Schmidt.

* cited by examiner

PRODUCTION OF PULVERULENT, POROUS CRYSTALLINE METAL SILICATES BY MEANS OF FLAME SPRAY PYROLYSIS

CROSS REFERENCE TO RELATED APPLICATIONS

The present application is US national stage of international application PCT/EP2018/082304, which had an international filing date of Nov. 23, 2018 and which was published on Jun. 13, 2019. The application claims priority to EP 17205799.4, filed in Europe on Dec. 7, 2017, the contents of which is hereby incorporated by reference in its entirety.

The present invention relates to a process for preparing pulverulent, porous crystalline metal silicates.

Silicates refer to the compounds formed by $SiO_4$ tetrahedra, the tetrahedra of which may be joined to one another in various ways. Silicate structures of this kind may contain other elements, for example metals, and are then called metal silicates. An important example of such metal silicates is that of zeolites.

Zeolites are crystalline silicates, for example aluminosilicates, in which a three-dimensional linkage of silicate tetrahedra ($SiO_4^-$) and other structural units (for example $AlO_4^-$ tetrahedra) gives rise to regular structures having cavities and pores. Various types of zeolites exist, which are named according to their structure type. General information relating to zeolites, especially crystal structure types of known zeolites, can be found in Ullmann's Encyclopedia of Industrial Chemistry, "Zeolites" chapter, published online on 15.04.2012, DOI: 10.1002/14356007.a28_475.pub2.

Due to their unique pore structure, zeolites can have interesting catalytic properties and can be used, for example, as oxidation catalysts.

Synthetic zeolites are often prepared by a hydrothermal synthesis in the presence of a pore structure-forming template. CN 101348263 A, for example, discloses a process for preparing zeolites having an Si/Al ratio of 50 to 5000 and a particle size of 30 to 200 μm that comprises the following process steps: (1) provision of a reaction mixture comprising silicon sources and aluminium sources and a metal hydroxide; (2) hydrolysis reaction; (3) subsequent spray-drying of the mixture to form aluminosilicate microspheres; (4) hydrothermal reaction of the microspheres prepared beforehand in the presence of water and an organic amine at a temperature of 160 to 200° C. and crystallization of the zeolite formed; and (5) washing, (6) drying and (7) calcination thereof at a temperature of 350 to 800° C.

U.S. Pat. No. 4,410,501 A discloses a process for preparing titanium silicalite. The titanium silicalite is prepared by (1) formation of a synthesis gel proceeding from a hydrolysable silicon compound, for example tetraethyl orthosilicate, and a hydrolysable titanium compound in the presence of tetra-n-propylammonium hydroxide at 175° C., (2) subsequent hydrothermal synthesis, hydrolysis and crystallization of this reaction mixture. After the crystallization has ended, the crystals are (3) removed by filtration, (4) washed, (5) dried and finally (6) calcined at 550° C. for 6 h.

EP 814058 A1 discloses the preparation of various zeolites from the corresponding pyrogenic mixed metal-silicon oxides. The mixed metal-silicon oxides are obtained by (1) hydrothermal synthesis at a temperature between 100 and 220° C. in the presence of a template selected from amines, ammonium compounds and alkali metal/alkaline earth metal hydroxides, followed by (2) filtration, (3) washing with water and (4) calcination, for example at a temperature of 550° C. within four hours. In a particular embodiment, by spray-drying, a preformed, template-containing granular mixed oxide material is prepared, which is subsequently subjected to a hydrothermal synthesis, filtered, washed and calcined.

CN1482062 discloses a process for preparing titanium silicalite-1, in which solid silica gel is subjected to hydrothermal reaction with an inorganic titanium source. The process comprises the following steps: (1) impregnation of solid silica gel with $Ti(SO_4)_2$, (2) calcination, (3) hydrothermal synthesis of silica gel with $Ti(SO_4)_2$+TPAOH+water, (4) filtration, (5) washing, (6) drying, (7) calcination.

All the above-described processes include time-consuming multistage procedures. More particularly, filtering and washing of the zeolite formed is necessary in order to remove impurities resulting from co-reactants or unreacted reactants, etc. This gives rise to considerable amounts of dirty water which often contains substances that are harmful to water organisms and are difficult to dispose of, such as tetraalkylammonium salts. It would therefore be very desirable to develop a process which firstly has a smaller number of process steps than conventional processes, and secondly solves the problem with the disposal of the production wastes.

These problems are solved by the process for preparing a pulverulent, porous crystalline metal silicate, comprising the following steps:

a) hydrothermal synthesis in an aqueous mixture comprising (A) at least one silicon source, (B) at least one metal source and (C) at least one mineralizer to obtain an aqueous suspension comprising a porous crystalline metal silicate as reaction product; and b) calcination of the reaction product, characterized in that the calcination is conducted by means of flame spray pyrolysis at an adiabatic combustion temperature within a range of 450-2200° C., wherein the suspension having a solids content of ≤70% by weight which is obtained in step a) is sprayed into a flame generated by combustion of a fuel in the presence of oxygen to form a pulverulent, porous crystalline metal silicate.

The metal silicate structure prepared in step a) of the process according to the invention is surprisingly conserved during the thermal treatment at relatively high temperatures in step b); this is particularly true of the porous structure of zeolites. The ordered pore structure, for example of zeolites, is known to be destroyed at elevated temperatures. For example, titanium silicalite-1, according to Advanced Materials Research Vol. 287-290, 2011, p. 317-321, undergoes irreversible structural changes even at 650° C. which can adversely affect the catalytic properties of such materials.

Figure 1:
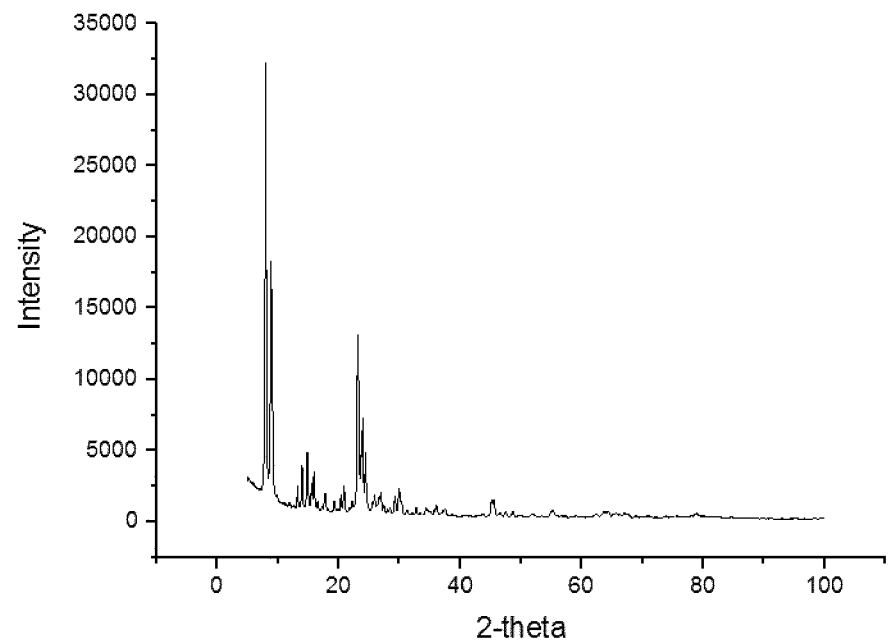
FIG. 1: XRD analysis of Comparative Example 1 showing that the product has the crystal structure of TS-1.

The pulverulent, porous crystalline metal silicate obtainable by the process according to the invention preferably has a zeolite structure.

Zeolites are crystalline silicates, for example aluminosilicates, in which a three-dimensional linkage of silicate tetrahedra ($SiO_4^-$) and other structural units (for example $AlO_4^-$ tetrahedra) via oxygen atoms gives rise to regular structures having cavities and pores. Various types of zeolites exist, which are named according to their structure type. General information relating to zeolites, especially crystal structure types of known zeolites, can be found in Ullmann's Encyclopedia of Industrial Chemistry, "Zeolites" chapter, published online on 15.04.2012, DOI: 10.1002/14356007.a28_475.pub2.

The pulverulent, porous crystalline metal silicate obtainable by the process according to the invention preferably has a zeolite structure with a crystal structure of the LTA, MFI, FAU, MOR, MEL or MWW type. Most preferably, the metal silicates have a crystal structure of the MFI and MEL type. The respective crystal structure type can be determined by structure analysis by means of x-ray diffraction (XRD). Structure types for micro- and mesoporous materials are laid down by the International Zeolite Association (IZA, www.iza-online.orq).

The pulverulent, porous crystalline metal silicate accessible by the process according to the invention preferably has micro- and mesopores. According to the IUPAC definition, micropores are understood to mean those having a diameter of less than 2 nm, and mesopores those of 2 to 50 nm.

The general composition of the pulverulent, porous crystalline metal silicates is typically $(SiO_2)_{1-x}(A_mO_n)_x$, A is a metal of valency p from the group consisting of Ti, Al, Zr, Fe, Sn, Ge, In and B; m and n are the number of atoms, where m×p=2n; x is a number between 0.0001 and 0.25, preferably between 0.001 and 0.2 and especially between 0.005 and 0.1. In the case of multiple different metals A, x correspondingly relates to the sum total of all metal oxides. A is preferably the elements titanium (Ti), aluminium (Al), zirconium (Zr), iron (Fe), tin (Sn) and boron (B), Ge (germanium), In (indium), particular preference being given to titanium (Ti).

The pulverulent, porous crystalline metal silicate obtainable by the process according to the invention may preferably be titanium silicate, boron silicate, zirconium silicate, aluminosilicate or iron silicate. Particular preference is given to titanium silicate, especially titanium silicalite-1 (MFI structure) or titanium silicalite-2 (MEL structure).

The silicon source used in the process according to the invention may in principle be any compound that contains silicon dioxide or silicon-containing mixed oxide, or can form it as a result of oxidation or thermal and/or hydrolytic breakdown. However, preference is given to the compounds that contain amorphous silicon dioxide or amorphous silicon-containing mixed oxide, or can form it by oxidation or thermal and/or hydrolytic breakdown. Such a silicon source may, for example, be selected from the group consisting of pyrogenic silicon dioxide, precipitated silicon dioxide, silicon dioxide produced by a sol-gel process and mixtures thereof.

Pyrogenic silicon dioxide, also called fumed silica, is prepared by means of a flame hydrolysis or flame oxidation. This involves oxidizing or hydrolysing hydrolysable or oxidizable starting materials, generally in a hydrogen/oxygen flame. Starting materials that may be used for pyrogenic methods include organic and inorganic substances. Silicon tetrachloride is particularly suitable. The hydrophilic silica thus obtained is amorphous. Fumed silicas are generally in aggregated form. "Aggregated" shall be understood to mean that what are called primary particles formed at first during generation make strong interconnections in the further course of the reaction to form a three-dimensional network. The primary particles are very substantially free of pores and have free hydroxyl groups on their surface.

The silicon dioxide prepared by precipitation (precipitated silica) forms, for example, in the reaction of waterglass solutions (sodium silicates) with mineral acids.

The sol-gel process is a process for preparing nonmetallic inorganic or hybrid-polymeric materials from colloidal dispersions, called the sols.

The starting materials for a sol synthesis are often alkoxides of metals or silicon. The hydrolysis of such starting materials and the condensation between the reactive species that form are the essential base reactions in the sol-gel process. Suitable silicon sources for sol-gel processes are especially the tetraalkyl orthosilicates where alkyl is preferably selected from the group consisting of methyl, ethyl, propyl and butyl. The most preferred tetraalkyl orthosilicate is tetraethyl orthosilicate.

The metal source used in the process according to the invention may be any compound that contains metal oxide or metal-containing mixed oxide, or can form the corresponding metal oxide or mixed oxide as a result of oxidation or thermal and/or hydrolytic breakdown. Metal sources used in the context of the present invention are the sources of the elements titanium (Ti), aluminium (Al), zirconium (Zr), iron (Fe), tin (Sn), germanium (Ge), indium (In) and boron (B), particular preference being given to titanium.

The person skilled in the art is at liberty to select suitable sources for silicon and metal. In principle, the person skilled in the art has the selection between the following combinations: a) the silicon source and the metal source are in liquid form, b) the silicon source is in solid form and the metal source is in liquid form, c) the silicon source and the metal source are together in one substance.

"In liquid form" means here that the silicon source and/or the metal source is in the form of a liquid or solution.

Silicon sources in solid form may, for example, be selected from the group consisting of pyrogenic silicon dioxide, precipitated silicon dioxide, silicon dioxide produced by a sol-gel process and mixtures thereof. Preference is given to a high-purity silicon dioxide prepared by precipitation or a pyrogenic silicon dioxide.

A high-purity silicon dioxide prepared by precipitation is a silicon dioxide prepared by precipitation and having a content of
 a. aluminium of not more than 1 ppm
 b. boron of not more than 0.1 ppm
 c. calcium of not more than 0.3 ppm
 d. iron of not more than 0.6 ppm
 e. nickel of not more than 0.5 ppm
 f. phosphorus of not more than 0.1 ppm
 g. titanium of not more than 1 ppm
 h. zinc of not more than 0.3 ppm,
where the sum total of the abovementioned elements and also sodium and potassium is less than 5 ppm. Such a high-purity silicon dioxide can be prepared by the process disclosed in WO 2010/037702. The content of WO 2010/037702 is fully incorporated here into the present application by reference.

The silicon source and metal source may be present together in one substance in various ways. Examples of such substances are mixed metal-silicon oxides, metal oxide-doped silicon dioxide, metal-impregnated silicon dioxide, metal silicate, metal-doped tetraalkyl orthosilicate and mixtures thereof. Substances of this kind are preferably amorphous. Preferably, such a substance is an amorphous silicon dioxide doped with metal oxide, an amorphous silicon dioxide impregnated with metal, or an amorphous mixed metal-silicon oxide.

A "mixed metal-silicon oxide" contains, as well as $SiO_2$, one or more metal oxides, preferably from the group of $GeO_2$, $In_2O_3$, $Al_2O_3$, $TiO_2$, $B_2O_3$, $SnO_2$, $ZrO_2$ or $Fe_2O_3$. Mixed metal-silicon oxides can be prepared by any suitable method, for example flame pyrolysis, coprecipitation, sol-gel process. Mixed metal-silicon oxides are known, for example, from EP0814058 or DE102007049742.

A "metal oxide-doped silicon dioxide" can be prepared by any known process, for example by flame pyrolysis or impregnation processes with subsequent calcination.

A "metal-impregnated silicon dioxide" can be prepared by any known impregnation process, for example by "incipient wetness" methods.

In a preferred embodiment of the process according to the invention, in step a), component (A) and component (B) are present together in one substance and this substance is selected from the group consisting of amorphous mixed metal-silicon oxide, amorphous silicon dioxide doped with metal oxide, amorphous silicon dioxide impregnated with metal, metal silicate, metal-doped tetraalkyl orthosilicate and mixtures thereof. More preferably, component (A) here is an amorphous silicon dioxide doped with metal oxide, an amorphous silicon dioxide impregnated with metal, or an amorphous mixed metal-silicon oxide.

In a further preferred embodiment of the process according to the invention, in step a), component (A) is in solid form and component (B) in liquid form. More preferably, component (A) here is selected from the group consisting of pyrogenic silicon dioxide, precipitated silicon dioxide, silicon dioxide produced by a sol-gel process and mixtures thereof. Most preferably, component (A) here is a high-purity silicon dioxide prepared by precipitation or a pyrogenic silicon dioxide.

Hydrothermal syntheses for pulverulent, porous crystalline metal silicates are known per se. The same applies to the hydrothermal synthesis of zeolites, especially of metal silicates. In principle, therefore, step a) of the process according to the invention is not restricted to particular parameters. Instead, all reactants and parameters that are known to those skilled in the art for hydrothermal syntheses of porous crystalline metal silicates are suitable here as well.

In step a) of the process according to the invention, by hydrothermal synthesis in an aqueous mixture comprising (A) at least one silicon source, (B) at least one metal source and (C) at least one mineralizer, an aqueous suspension comprising a porous crystalline metal silicate is obtained as reaction product. Hydrothermal synthesis, also called hydrothermal crystal growth, is a crystallization from aqueous mixtures at temperatures above 100° C. to about 300° C. and elevated pressure up to about 100 bar. This means that growth from aqueous mixtures is usable for substances that are normally sparingly soluble. Preferably, step a) of the process according to the invention is conducted at a temperature of 100 to 250° C., more preferably of 100 to 200° C., under the autogenous pressure generated in a pressure-resistant reactor, for example an autoclave. The pressure established in the hydrothermal synthesis in step a) of the process according to the invention may be within a range from 1.05 to 50 bar. Preferably, the pressure is within a range from 1.5 to 30 bar; more preferably, the pressure is within a range from 2 to 20 bar.

Under the aforementioned conditions of the process according to the invention, the duration of the performance of step a) of the process according to the invention is conventionally less than 12 hours. Preferably, the performance time of step a) is within a range from 0.1 to 6 hours; it is more preferably within a range from 0.5 to 4 hours.

Mineralizers used in most cases are HF or organic or inorganic bases, such as quaternary ammonium hydroxides, for example tetrapropylammonium hydroxide, or inorganic hydroxides such as sodium hydroxide, potassium hydroxide, ammonium hydroxide or calcium hydroxide. They can serve for better dissolution of the silicon sources and metal sources and bring about the attainment of the ideal pH for the crystal formation. Furthermore, it is possible also to use compounds that can form complexes with the metal sources and silicon sources as mineralizers. The hydrothermal synthesis is typically conducted in a basic medium at a pH exceeding 7. Preferably, the pH is within a range from 8 to 14; more preferably, it is within a range from 9 to 13.

For optimal performance of step a) of the process according to the invention, the aqueous mixture may additionally comprise suitable seed crystals. Seed crystals of this kind are known to the person skilled in the art.

In the process according to the invention, the aqueous mixture in step a) may additionally comprise a template selected from the group consisting of amines, quaternary ammonium compounds, alcohols and mixtures thereof. A template is a compound which, by incorporation into the crystal lattice of the product during the hydrothermal synthesis, determines the crystal structure of the metal silicate formed. Examples of suitable amines are: tri(n-propyl) amine, di(n-propyl)amine, n-propylamine, di(n-butyl) amine, ethylenediamine, propanolamine, ethanolamine, quinuclidine and substituted derivatives thereof, ammonia, ammonium salts, morpholine, 1,5-diaminopentane, 1,6-diaminohexane, dipropylenetriamine, dihexamethylenetriamine, triethylenetetramine, diethylenetriamine, 1-alkyl-4-azobicyclo[2.2.2]octane 4-oxide halides. Examples of suitable alcohols are: glycerol, hexanediol, pentanediol.

Particular preference is given to using tetraalkylammonium compounds such as tetraalkylammonium hydroxides, especially tetra-n-propylammonium hydroxide (TPAOH), for example for preparation of titanium silicalite-1 (MFI structure), tetra-n-butylammonium hydroxide, for example for preparation of titanium silicalite-2 (MEL structure) and tetraethylammonium hydroxide. The quaternary ammonium compounds are preferably used in the form of aqueous solutions.

The molar ratio of the amount of template used in step a) of the process according to the invention to the amount of silicon used is not limited in principle. Preferably, $0.12 \leq$ mol of template/mol of silicon $< 0.20$.

The term "flame spray pyrolysis" is well known to the person skilled in the art and relates to a process for thermal oxidative conversion of a liquid raw material finely distributed in the gas stream by spraying or of a suspension in a flame generated by combustion of a fuel in the presence of oxygen. Flame spray pyrolysis is an established process for preparation of metal oxides, described, for example, in WO 2017/001366 A1 and US 2002/0041963 A1. For example, WO 2017/001366 A1 discloses a process of this kind for preparation of metal oxide powders by means of flame spray pyrolysis, in which a siloxane-containing aerosol is introduced directly into the flame in a reactor, where it is converted to silicon dioxide.

Examples of fuels used in step b) of the process according to the invention include hydrogen, methane, ethane, propane, butane, natural gas and mixtures thereof. These are preferably supplied in a gaseous state to the reactor suitable for the performance of step b).

The oxygen can be fed in in the form of any oxygenous gas. Preference is given to using air.

The adiabatic combustion temperature is a standard parameter in the specialist field for characterization of the combustion process of at least one fuel and an oxidant, the state of which is known prior to commencement of the combustion. Accordingly, the adiabatic combustion temperature, for example in a corresponding reactor, can be calculated in a manner known to the person skilled in the art from the known process parameters such as preheating temperatures, mass flow rates et al.

The adiabatic combustion temperature during the performance of step b) of the process according to the invention is within a range from 450 to 2200° C. The adiabatic combustion temperature is especially preferably within a range from 450 to 1600° C., more preferably within a range from 500 to 1400° C., further preferably within a range from 500 to 1200° C., further preferably within a range from 550 to 1000° C., most preferably within a range from 600 to 900° C.

According to the site of measurement thereof, the temperature actually generated in the flame varies within a relatively wide range. For instance, in step b) of the process according to the invention, the temperature measured 1.5 m beneath the ignition site may be at least 300° C.; preferably, the temperature 1.5 m below the ignition site is within a range from 400 to 800° C.

The average residence time of the suspension obtained in step a) in the reactor for the performance of step b) may be from 1 ms to 100 s. Preferably, the average residence time is within a range from 0.1 to 10 s; more preferably within a range from 0.5 to 5 s. The calculation of the abovementioned average residence time in the reactor ($<t>$, [s]) is conducted using the total volume of gas fed to the reactor per unit time ($V_t$, [m$^3$/s (STP)]) and reactor volume ($V_R$, [m$^3$]).

$$<t>=V_R/v_t$$

The abovementioned temperatures and the average residence time in step b) of the process according to the invention are preferably selected such that the oxidative breakdown of the organic template takes place in this step, but the porous structure of the product obtained is not damaged by excessively high temperatures. Thus, if a relatively high flame temperature which, in the event of sustained application, could lead to irreversible changes in the pore structure of a metal silicate is set, it is advantageous to choose a relatively short residence time in the flame.

The solids content $w_{FT}$ (% by wt.) of the aqueous suspension obtained in step a) can be calculated from the total mass of this suspension ($M_S$) and the mass of water in this suspension ($M_{H2O}$):

$$w_{FT}=(M_S-M_{H2O})/M_S*100\%$$

The solids content of the suspension obtained in step a) is ≤70% by weight. Preferably, the solids content is within a range from 10% to 70% by weight; it is more preferably within a range from 10% to 60% by weight; it is most preferably within a range from 20% to 50% by weight. A higher solids content than 70% by weight would cause technical difficulties in the spraying and flame spray pyrolysis in step b) of the process according to the invention, while a lower solids content than 10% by weight would adversely affect the economic viability of the process owing to an excessively large amount of water to be evaporated. The person skilled in the art is aware of methods of adjusting the solids content; for example, the reactants can be used in a suitable concentration or the suspension can be correspondingly diluted.

The median particle diameter (d50) of the metal silicate particles in the aqueous dispersion that are obtained in step a) of the process according to the invention is preferably less than 500 nm and more preferably less than 400 nm. The median particle diameter of the metal silicate particles can be determined, for example, by means of dynamic laser light scattering (DLS).

Ignition loss (in % by weight) is defined by DIN 18128: 2002-12 as the proportion of organic substances in a sample. The ashing removes the organic component in the sample; for example, the carbon present is oxidized and escapes as carbon dioxide. The ignition loss according to DIN 18128: 2002-12 of the pulverulent, porous crystalline metal silicate obtained by the process according to the invention is preferably less than 5% by weight, more preferably less than 3% by weight, most preferably less than 2% by weight.

If a template is used, preferably at least partial thermal and/or oxidative breakdown of the template takes place in step b) of the process according to the invention. More preferably, the template used is broken down here to an extent of more than 70% by weight, most preferably to an extent of more than 90% by weight.

The pulverulent, porous crystalline metal silicates obtained by the process according to the invention may have a specific surface area of ≥20 m$^2$/g, preferably of 30 to 800 m$^2$/g, more preferably of 50 to 700 m$^2$/g, most preferably of 70 to 600 m$^2$/g. The specific surface area, also referred to simply as BET surface area, is determined according to DIN 9277:2014 by nitrogen adsorption in accordance with the Brunauer-Emmett-Teller method.

The cumulated nitrogen pore volume desorbed is calculated according to BJH (BARRETT, JOYNER and HALENDA, *Journal of the American Chemical Society*, 73:373-380, 1951)

The process according to the invention affords porous crystalline metal silicates in powder form. For the use thereof as oxidation catalysts, they can be converted as desired to a form suitable for use, for example microgranules, spheres, tablets, solid cylinders, hollow cylinders or honeycombs, by known processes for shaping powder catalysts, for example compaction, granulation, spray drying, spray granulation or extrusion.

In a further embodiment of the process according to the invention, step b) is followed by a shaping c), comprising the steps of (1) adding water to obtain an aqueous suspension of the porous crystalline metal silicate, (2) mixing the suspension from step (1) with granulating aids, (3) compaction, granulation, spray-drying, spray granulation or extrusion to obtain a porous crystalline metal silicate in the form of microgranules, spheres, tablets, solid cylinders, hollow cylinders or honeycombs.

The particle size of such shaped bodies is preferably within a range from 0.1 to 10 mm.

For the mixing and shaping, it is possible to use all known mixing and shaping devices and processes, and to use all standard granulating aids. Known shaping devices of this kind are described, for example, in Ullmann's Enzyklopädie der Technischen Chemie [Ullmann's Encyclopedia of Industrial Chemistry], 4th edition, volume 2, page 295 ff., 1972. Preference is given to using single- and twin-screw extruders or an extrudate press. It is possible here to produce numerous known geometries, for example solid cylinders, hollow cylinders, stars etc. However, it is also possible to produce honeycombs.

The aqueous suspension obtained in step a) of the process according to the invention is sprayed during the performance of step b), i.e. finely distributed in the surrounding gas, and thus forms an aerosol, a triphasic solid/liquid/gas mixture consisting of gas with liquid droplets finely distributed therein, which in turn comprise solid particles. The gas used for the spraying of the aqueous suspension may comprise oxygen and/or at least one of the above-listed fuels and/or at least one inert gas, for example nitrogen. For the spraying, preference is given to using $N_2$, $H_2$ or air, particular preference being given to air.

The aerosol formed in step a) in the spraying of the aqueous suspension preferably comprises liquid droplets having a numerical average droplet diameter of not more than 2 mm, more preferably of not more than 1 mm, most preferably of not more than 0.5 mm. Such a numerical average particle size of the liquid droplets in aerosol can be calculated, for example, by a person skilled in the art and results from the dimensions of the apparatuses used, corresponding flow rates, liquid and gas properties, and other parameters. Alternatively, the numerical average particle size of the aerosol formed in step a) can be measured directly by means of the laser diffraction method. The resulting measured droplet size distribution is used to define the median $d_{50}$, which reflects the droplet size not exceeded by 50% of all particles, as the numerical average particle size.

The spraying of the aqueous suspension that takes place in step b) of the process according to the invention can be achieved by means of different apparatuses and instruments that are known to the person skilled in the art for this purpose. For example, it is possible here to use disc atomizers, rotary atomizers, ultrasound atomizers, one-phase, two-phase or multiphase nozzles, and various injector systems or similar systems.

Preferably, the aqueous suspension in step b) of the process according to the invention is sprayed into the flame via at least one nozzle.

The oxygen used in step b) of the process according to the invention can be fed to the flame spray pyrolysis reactor at multiple sites. For instance, the suspension used can be sprayed in a first gas stream comprising air, while the majority of air (primary air) is supplied to the flame as a second gas stream parallel to the flow direction of the sprayed suspension supplied, and a third gas stream (secondary air) can be fed in tangentially (at right angles to the flow direction of the sprayed suspension supplied), for example to avoid material deposits. It may likewise be advantageous to supply the fuel to the reactor at multiple sites, for example a main stream (primary fuel stream) together with the primary air stream and a secondary stream (secondary fuel stream, outer fuel), for example for stabilization of the flame generated.

It is particularly advantageous when, in the performance of step b) of the process according to the invention, the amount of oxygen is in excess compared to the total amount of all combustible constituents of the reaction mixture. The reaction mixture is understood here to mean the suspension converted in step b) together with the gaseous components used in step b). The combustible constituents of this reaction mixture include, for example, the fuels and templates used. The index λ (lambda) is the ratio of the amount of oxygen present in the reaction mixture divided by the amount of oxygen needed for the complete combustion of all combustible constituents of the reaction mixture, each in mol/h. Preferably, λ is set at 1 to 10; more preferably, λ of 2 to 6 is chosen.

The oxygen and fuel used for the performance of step b) of the process according to the invention may be introduced in preheated form. A suitable temperature range here is from 50 to 400° C. The suspension generated in step a) of the process according to the invention can also be introduced into the flame preheated to a temperature of 50 to 300° C. More preferably, this suspension can be used in step b) directly after production in step a) without cooling.

The ratio of total gas volume used in step b) in standard cubic metres to the amount of the aqueous suspension used in kg is preferably from 0.1 to 100 m³ (STP)/kg, more preferably from 0.5 to 50 m³ (STP)/kg, most preferably from 1 to 10 m³ (STP)/kg.

By means of the process according to the invention, it is more preferably possible to obtain titanium-containing zeolites of the titanium silicalite-1 and titanium silicalite-2 type, which can be used as catalysts in oxidation reactions with hydrogen peroxide. More particularly, it is possible to use such titanium-containing zeolites as catalysts in the epoxidation of olefins by means of aqueous hydrogen peroxide.

EXAMPLES

Example 1

Preparation of the Raw Suspension by Hydrothermal Synthesis

The synthesis of the titanium silicalite-1 zeolite (TS-1; MFI structure type) was conducted in a 3 m³ pressure reactor and was in accordance with the corresponding method from Example 1 of EP 0814058 B1. The silicon source used was an amorphous, high-purity silicon dioxide (manufacturer: Evonik Industries), and the titanium source used was an aqueous titanium-tetrapropylammonium hydroxide solution (Ti-TPA solution) having a content of 19.0% by weight of $TiO_2$. The Ti-TPA solution was prepared as follows:

Mixing of 90.1 kg of deionized water, 167.3 kg of a 40% aqueous tetrapropylammonium hydroxide solution (manufacturer: Sachem) and 141.6 kg of tetraethyl orthotitanate (manufacturer: Connect Chemicals GmbH) at 40° C. in a closed vessel for one hour. The exothermicity of the reaction resulted in a temperature rise of about 25° C. This was followed by the distillative removal of the ethanol formed at 80° C. at a distillation rate of 30 l/h. The target value for the resultant Ti-TPA solution was a $TiO_2$ content of 19.0% by weight. After cooling, the Ti-TPA solution was used in the TS-1 synthesis.

The pressure reactor was initially charged with: 500 kg of high-purity silicon dioxide (Evonik Industries), 382 kg of a 40% aqueous tetrapropylammonium hydroxide solution (manufacturer: Sachem), 193 kg of Ti-TPA solution, 10 kg of silicalite-1 seed crystals and 1800 kg of deionized water. The mixture was stirred in the closed pressure reactor at a stirrer speed of 50 rpm at 170° C. for 3 h. The heating time to 170° C. was 180 min; after a cooling time of 150 min, the synthesis was ended. The stirring at a stirrer speed of 50 rpm was continued from the start until the end of the synthesis.

The silicalite-1 seed crystals were prepared by hydrothermal synthesis of 500 kg of high-purity silicon dioxide (Evonik Industries), 400 kg of a 40% aqueous tetrapropylammonium hydroxide solution (manufacturer: Sachem) and 1800 kg of deionized water in a pressure reactor. The mixture was stirred in the closed pressure reactor at a stirrer speed of 50 rpm at 160° C. for 3 h. The heating time to 160° C. was 180 min; after a cooling time of 150 min, the synthesis was ended. The stirring at a stirrer speed of 50 rpm was continued from the start until the end of the synthesis.

Comparative Example 1

Conventional Workup after the Hydrothermal Synthesis

Acetic acid (60% by weight) was added to the raw suspension described in Example 1 up to pH=7, and the precipitate formed was filtered on a filter press and washed with distilled water. The solids obtained were dried by means of spray drying with an inlet temperature of 420° C. and with an atomizer speed of 1700 $min^{-1}$ (exit temperature of 110° C.). Subsequently, the partly dried powder was calcined at a maximum of 650° C. in a rotary tube for 2 h. The product thus obtained had a BET surface area of 470 $m^2/g$ and an ignition loss (measured at 550° C.) of 0.65%. XRD analysis (FIG. 1) showed that the product has the crystal structure of TS-1 (ICDD reference code: 01-089-8099). Pore analysis with nitrogen according to BJH gave a pore volume of 0.23 ml/g.

Example 2

Spray Calcination after the Hydrothermal Synthesis (600° C.)

Figure 2:
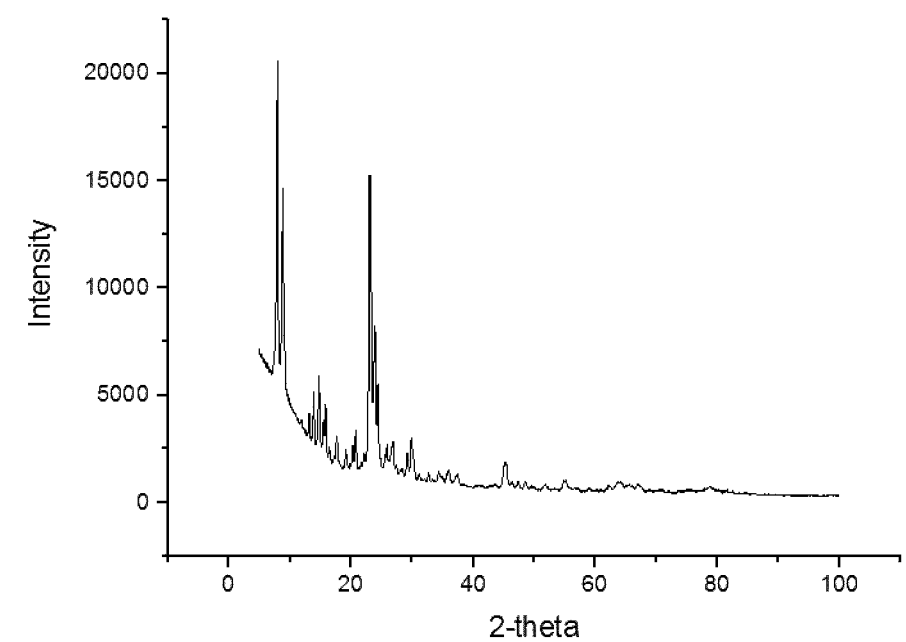
FIG. 2: XRD analysis of Example 2 showing that the product has the crystal structure of TS-1.

The raw suspension (16 kg/h) described in Example 1 was sprayed in a pilot plant with 18 $m^3/h$ of nitrogen for atomization through a two-phase nozzle with internal diameter 2 mm and gap 1 mm. The hydrogen/air flame was operated with 10 $m^3/h$ of hydrogen and 45 $m^3/h$ of primary air. For avoidance of material deposits, 25 $m^3/h$ of secondary air were injected tangentially. The temperature measured 1.5 m below the ignition site was adjusted to 600° C. by slight variation of the hydrogen. The adiabatic combustion temperature in the reactor was about 680° C. The residence time in the reactor was about 1.1 s. The offgases, including calcined zeolite, were guided through a water-cooled cooling zone (coolant temperature: 25° C.) having a diameter of 100 mm and a length of 6 m and then collected at filter candles at max. 250° C. By sequential cleaning of the filter candles, it was possible to collect the ready-calcined product (4.35 kg/h). The product thus obtained had a BET surface area of 499 $m^2/g$ and an ignition loss (measured at 550° C.) of 1.35%. XRD analysis (FIG. 2) showed that the product has the crystal structure of TS-1 (ICDD reference code: 01-089-8099). Pore analysis with nitrogen according to BJH gave a pore volume of 0.3 ml/g.

Comparative Example 2 (Negative Example)

Spray Calcination after the Hydrothermal Synthesis (400° C.)

The raw suspension (15 kg/h) described in Example 1 was sprayed in a pilot plant with 18 $m^3/h$ of nitrogen for atomization through a two-phase nozzle with internal diameter 2 mm and gap 1 mm. The hydrogen/air flame was operated with 8 $m^3/h$ of hydrogen and 45 $m^3/h$ of primary air. The temperature measured 1.5 m below the ignition site was adjusted to 400° C. by slight variation of the hydrogen. The adiabatic combustion temperature in the reactor was about 544° C. The residence time in the reactor was 1.35 s. The offgases, including calcined zeolite, were guided through a water-cooled cooling zone (coolant temperature: 25° C.) having a diameter of 100 mm and a length of 6 m and then collected at filter candles at max. 250° C. By sequential cleaning of the filter candles, it was possible to collect the ready-calcined product (4.4 kg/h). The product thus obtained had a BET surface area of 240 $m^2/g$ and an ignition loss (measured at 550° C.) of 9.0%. Owing to the high ignition loss, the product obtained is unsuitable for further processing to give the end product and use in the HPPO test reaction.

Example 3

Spray Calcination After the Hydrothermal Synthesis (700° C.)

Figure 3:
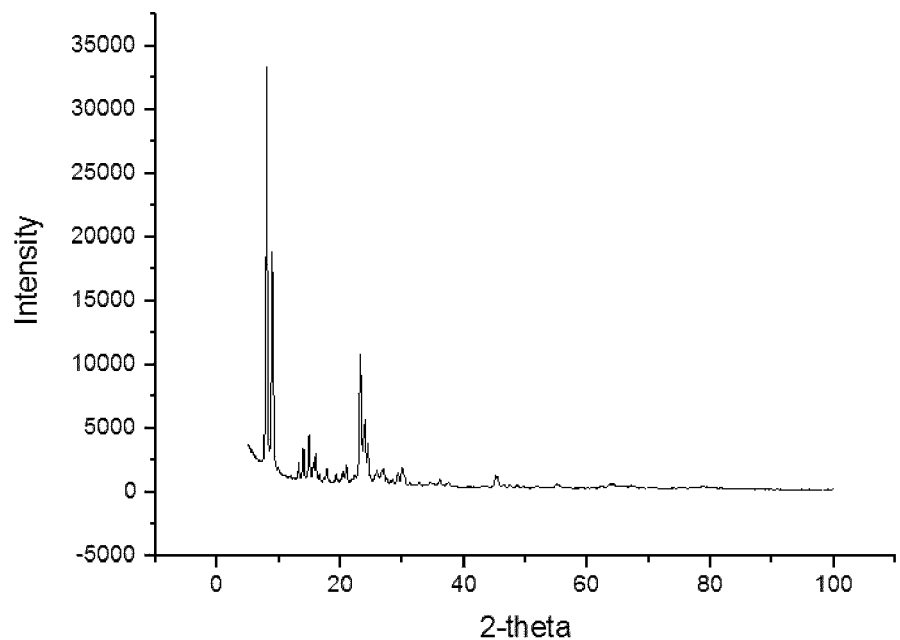
FIG. 3: XRD analysis of Example 3 showing that the product has the crystal structure of TS-1.

The raw suspension (30 kg/h) described in Example 1 was sprayed in a pilot plant with 18 $m^3/h$ of air for atomization through a two-phase nozzle with internal diameter 2 mm and gap 1 mm. The hydrogen/air flame was operated with 9.1 $m^3/h$ of hydrogen and 27 $m^3/h$ of primary air. The temperature measured 1.5 m below the ignition site was adjusted to 700° C. by slight variation of the hydrogen. The adiabatic combustion temperature in the reactor was about 750° C. The residence time in the reactor was about 1.1 s. The offgases, including calcined zeolite, were guided through a quench gas-cooled cooling zone (10 l/h of $H_2O$, 4 $m^3/h$ of air) having a diameter of 100 mm and a length of 6 m and then collected at filter candles at max. 250° C. By sequential cleaning of the filter candles, it was possible to collect the ready-calcined product (8.7 kg/h). The product thus obtained had a BET surface area of 506 $m^2/g$ and an ignition loss (measured at 550° C.) of 1.1%. XRD analysis (FIG. 3) showed that the product has the crystal structure of TS-1 (ICDD reference code: 01-089-8099). Pore analysis with nitrogen according to BJH gave a pore volume of 0.3 ml/g.

Example 4

Spray Calcination After the Hydrothermal Synthesis (800° C.)

Figure 4:
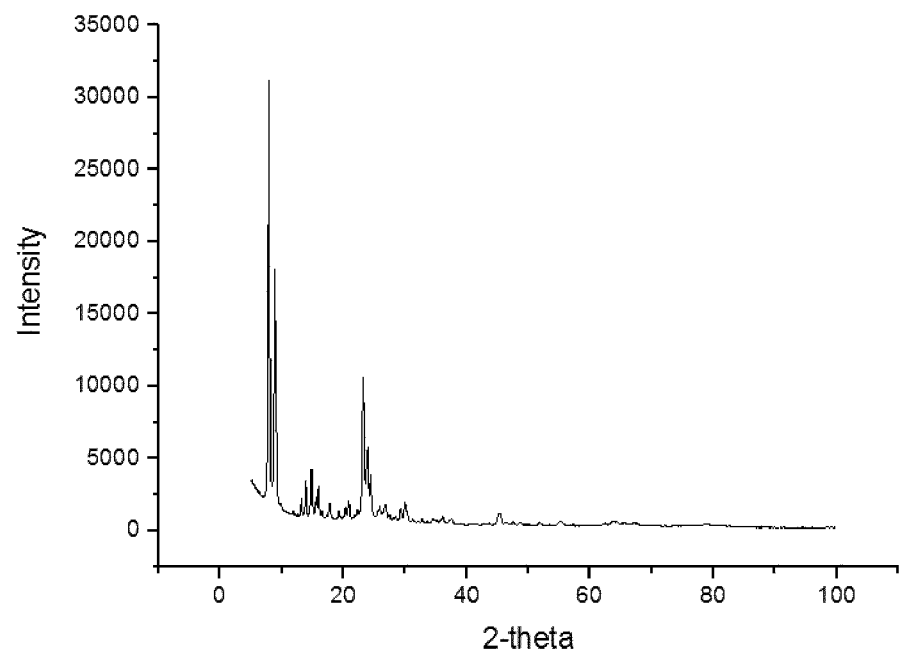
FIG. 4: XRD analysis of Example 4 showing that the product has the crystal structure of TS-1.

The raw suspension (14 kg/h) described in Example 1 was sprayed in a pilot plant with 18 $m^3/h$ of nitrogen for atomization through a two-phase nozzle with internal diameter 2 mm and gap 1 mm. The hydrogen/air flame was operated with 12.2 $m^3/h$ of hydrogen and 40 $m^3/h$ of primary air. The temperature measured 1.5 m below the ignition site was adjusted to 800° C. by slight variation of the hydrogen. The adiabatic combustion temperature in the reactor was about 830° C. The residence time in the reactor was 0.85 s. The offgases, including calcined zeolite, were guided through a water-cooled cooling zone (coolant temperature: 25° C.) having a diameter of 100 mm and a length of 6 m and then collected at filter candles at max. 250° C. By sequential cleaning of the filter candles, it was possible to collect the ready-calcined product (4.2 kg/h). The product thus obtained had a BET surface area of 477 $m^2/g$ and an ignition loss (measured at 550° C.) of 0.87%. XRD analysis (FIG. 4) showed that the product has the crystal structure of TS-1 (ICDD reference code: 01-089-8099). Pore analysis with nitrogen according to BJH gave a pore volume of 0.3 ml/g.

Comparative Example 3

Shaping of the Zeolite Powder from Comparative Example 1

The powder from Comparative Example 1 (1200 g) was mixed with 75 g of methyl hydroxyethyl cellulose (Tylose MH1000), 75 g of Licowax C, 1000 g of silica sol solution (Koestrosol 0830 AS) and 350 g of deionized water in an Eirich mixer. The mass obtained was extruded with an extruder (HB-Feinmechanik LTW 63) through a perforated plate with diameter 3.2 mm. The extrudates were then dried in a drying cabinet at 80° C. for one hour and calcined in a muffle furnace at 570° C. for 12 h.

Example 5

Shaping of the Zeolite Powder from Example 2

The powder from Example 2 (1200 g) was mixed with 75 g of methyl hydroxyethyl cellulose (Tylose MH1000), 75 g of Licowax C, 1000 g of silica sol solution (Koestrosol 0830 AS) and 350 g of deionized water in an Eirich mixer. The mass obtained was extruded with an extruder (HB-Feinmechanik LTW 63) through a perforated plate with diameter 3.2 mm. The extrudates were then dried in a drying cabinet at 80° C. for one hour and calcined in a muffle furnace at 570° C. for 12 h.

Example 6

Catalytic Test with the Catalyst from Comparative Example 3

The epoxidation of propene by means of hydrogen peroxide (60%) was effected over two fixed bed reactors, each of which contained 9 g of catalyst from Comparative Example 3 in the form of extrudates. The reactors were arranged in series (reactor 1→reactor 2) and were operated in upward flow. The first feed stream with a total flow rate of 20 g/h, consisting of methanol, hydrogen peroxide and water, and a second feed stream consisting of 20 g/h of propene were both fed to the first reactor. The reaction pressure was kept at 25 bar by means of a pressure-retaining valve downstream of the second reactor. The reaction mixture exiting from the second fixed bed reactor was expanded to ambient pressure. The resulting gas phase was analysed for propene, propylene oxide and oxygen, and the resulting liquid phase was analysed for propylene oxide and hydrogen peroxide. The initial selectivity for propylene oxide after a reaction run time of 23 h was 91.1%. After 480 h, the selectivity for propylene oxide was 97.7%.

Example 7

Catalytic Test with the Catalyst from Example 5

The catalytic epoxidation of propene was effected according to Example 6, but with the catalyst prepared in Example 5.

The initial selectivity for propylene oxide after a reaction run time of 25 h was 93.5%. After 480 h, the selectivity for propylene oxide was 98.6%.

TABLE 1

Comparison of the results of catalytic test reactions

| | S(PO), % after 480 h | Space-time yield, kg PO/kg cat-h |
|---|---|---|
| Example 6: Conventionally prepared catalyst (Comparative Example 3) | 97.7 | 0.21 |
| Example 7: Inventive catalyst (Example 5) | 98.6 | 0.21 |

As shown by Examples 2-4 by comparison with Comparative Example 1, the process according to the invention contains much fewer process steps than the conventional process. Moreover, this dispenses with the problems of disposing of the wastewaters that typically arise during the filtration and cleaning of the product after the hydrothermal synthesis. Surprisingly, the titanium silicalites obtained, after the flame spray pyrolysis, have a porosity comparable to the conventionally prepared titanium silicalite.

As apparent from Examples 6 and 7 and from Table 1, both the conventionally prepared catalyst (Comparative Example 3) and the catalyst which has been obtained from the metal silicate prepared in accordance with the invention (Example 5), after an operating time of 480 h in the epoxidation of propylene to propylene oxide (PO), are highly active and selective. The catalyst which has been obtained from the metal silicate prepared in accordance with the invention actually shows a higher selectivity for propylene oxide by 0.9% than the conventional catalyst with a comparable space-time yield. With a catalyst which has been obtained from a titanium silicalite prepared in accordance with the invention, based on unit time and reactor volume, it is thus possible to distinctly increase the product yield of propylene oxide.

Crystallographic Data of Titanium Silicalite-1 (Source: ICDD Database)
Reference code: 01-089-8099
Name of the compound: silicon titanium oxide
ICSD code: 88413
Reference: Lamberti, C., Bordiga, S., Zecchina, A., Carati, A., Fitch, A. N., Artioli, G., Petrini, G., Salvalaggio, M., Marra, G. L., *J. Catal.*, 183, 222, (1999)
List of Reflections:

| Number | h | k | l | d [Å] | 2θ [°] | I [%] |
|---|---|---|---|---|---|---|
| 1 | 0 | 1 | 1 | 11.17140 | 7.908 | 100.0 |
| 2 | 1 | 0 | 1 | 11.17140 | 7.908 | 100.0 |
| 3 | 2 | 0 | 0 | 10.07340 | 8.771 | 33.7 |
| 4 | 0 | 2 | 0 | 9.97825 | 8.855 | 36.2 |
| 5 | 1 | 1 | 1 | 9.74800 | 9.065 | 17.1 |
| 6 | 2 | 1 | 0 | 8.99270 | 9.828 | 1.3 |
| 7 | 2 | 0 | 1 | 8.05720 | 10.972 | 0.5 |
| 8 | 1 | 2 | 1 | 7.44190 | 11.882 | 1.1 |
| 9 | 2 | 1 | 1 | 7.44190 | 11.882 | 1.1 |
| 10 | 2 | 2 | 0 | 7.08909 | 12.476 | 0.3 |
| 11 | 0 | 0 | 2 | 6.71210 | 13.180 | 4.1 |
| 12 | 1 | 0 | 2 | 6.36799 | 13.896 | 8.3 |
| 13 | 1 | 1 | 2 | 6.06662 | 14.589 | 1.0 |
| 14 | 3 | 0 | 1 | 6.00599 | 14.738 | 9.2 |
| 15 | 0 | 3 | 1 | 5.96048 | 14.851 | 6.0 |
| 16 | 1 | 3 | 1 | 5.71559 | 15.491 | 5.5 |
| 17 | 0 | 2 | 2 | 5.58570 | 15.853 | 5.7 |
| 18 | 2 | 0 | 2 | 5.58570 | 15.853 | 5.7 |
| 19 | 2 | 1 | 2 | 5.36799 | 16.501 | 1.9 |
| 20 | 1 | 2 | 2 | 5.36799 | 16.501 | 1.9 |
| 21 | 2 | 3 | 1 | 5.14575 | 17.219 | 0.8 |
| 22 | 3 | 2 | 1 | 5.14575 | 17.219 | 0.8 |
| 23 | 4 | 0 | 0 | 5.03670 | 17.594 | 2.4 |
| 24 | 0 | 4 | 0 | 4.98912 | 17.764 | 3.4 |

-continued

| Number | h | k | l | d [Å] | 2θ [°] | I [%] |
|---|---|---|---|---|---|---|
| 25 | 4 | 1 | 0 | 4.88356 | 18.151 | 0.4 |
| 26 | 2 | 2 | 2 | 4.88356 | 18.151 | 0.4 |
| 27 | 4 | 0 | 1 | 4.71570 | 18.803 | 0.1 |
| 28 | 3 | 1 | 2 | 4.61852 | 19.202 | 2.4 |
| 29 | 1 | 4 | 1 | 4.55547 | 19.470 | 0.3 |
| 30 | 4 | 2 | 0 | 4.49635 | 19.729 | 0.2 |
| 31 | 2 | 4 | 0 | 4.45787 | 19.901 | 0.5 |
| 32 | 3 | 3 | 1 | 4.45787 | 19.901 | 0.5 |
| 33 | 0 | 1 | 3 | 4.36632 | 20.322 | 3.0 |
| 34 | 1 | 0 | 3 | 4.36632 | 20.322 | 3.0 |
| 35 | 4 | 2 | 1 | 4.26355 | 20.818 | 5.0 |
| 36 | 1 | 1 | 3 | 4.26355 | 20.818 | 5.0 |
| 37 | 2 | 0 | 3 | 4.08941 | 21.715 | 1.1 |
| 38 | 4 | 3 | 0 | 4.01553 | 22.119 | 1.9 |
| 39 | 2 | 1 | 3 | 4.01553 | 22.119 | 1.9 |
| 40 | 4 | 1 | 2 | 3.94894 | 22.497 | 0.3 |
| 41 | 4 | 3 | 1 | 3.85926 | 23.027 | 30.6 |
| 42 | 5 | 0 | 1 | 3.85926 | 23.027 | 30.6 |
| 43 | 3 | 4 | 1 | 3.82578 | 23.231 | 23.6 |
| 44 | 0 | 5 | 1 | 3.82578 | 23.231 | 23.6 |
| 45 | 1 | 5 | 1 | 3.75861 | 23.652 | 10.4 |
| 46 | 3 | 0 | 3 | 3.72380 | 23.877 | 15.6 |
| 47 | 0 | 3 | 3 | 3.72380 | 23.877 | 15.6 |
| 48 | 3 | 1 | 3 | 3.65139 | 24.357 | 12.3 |
| 49 | 1 | 3 | 3 | 3.65139 | 24.357 | 12.3 |
| 50 | 5 | 2 | 1 | 3.59942 | 24.714 | 1.2 |
| 51 | 4 | 4 | 0 | 3.54454 | 25.103 | 0.1 |
| 52 | 3 | 2 | 3 | 3.48877 | 25.511 | 1.8 |
| 53 | 2 | 3 | 3 | 3.48877 | 25.511 | 1.8 |
| 54 | 4 | 3 | 2 | 3.44594 | 25.834 | 4.1 |
| 55 | 3 | 4 | 2 | 3.44594 | 25.834 | 4.1 |
| 56 | 5 | 1 | 2 | 3.40404 | 26.157 | 1.0 |
| 57 | 1 | 5 | 2 | 3.38191 | 26.332 | 0.8 |
| 58 | 0 | 0 | 4 | 3.35780 | 26.524 | 2.2 |
| 59 | 6 | 0 | 0 | 3.35780 | 26.524 | 2.2 |
| 60 | 5 | 3 | 1 | 3.34523 | 26.626 | 1.1 |
| 61 | 4 | 0 | 3 | 3.34523 | 26.626 | 1.1 |
| 62 | 0 | 6 | 0 | 3.32608 | 26.782 | 2.1 |
| 63 | 3 | 5 | 1 | 3.32608 | 26.782 | 2.1 |
| 64 | 6 | 1 | 0 | 3.31043 | 26.911 | 3.6 |
| 65 | 1 | 0 | 4 | 3.31043 | 26.911 | 3.6 |
| 66 | 5 | 2 | 2 | 3.26581 | 27.286 | 0.6 |
| 67 | 1 | 1 | 4 | 3.26581 | 27.286 | 0.6 |
| 68 | 6 | 0 | 1 | 3.25744 | 27.357 | 0.7 |
| 69 | 3 | 3 | 3 | 3.24744 | 27.443 | 1.2 |
| 70 | 2 | 5 | 2 | 3.24744 | 27.443 | 1.2 |
| 71 | 6 | 1 | 1 | 3.21490 | 27.726 | 0.1 |
| 72 | 2 | 0 | 4 | 3.18399 | 28.001 | 0.7 |
| 73 | 6 | 2 | 0 | 3.18399 | 28.001 | 0.7 |
| 74 | 4 | 2 | 3 | 3.17173 | 28.111 | 0.4 |
| 75 | 1 | 2 | 4 | 3.14203 | 28.383 | 1.2 |

The invention claimed is:

1. A process for preparing a pulverulent, porous crystalline metal silicate, comprising the steps of:
   a) hydrothermal synthesis in an aqueous mixture comprising: (A) at least one silicon source; (B) at least one metal source; and (C) at least one mineralizer; to obtain an aqueous suspension comprising a porous crystalline metal silicate as a reaction product and having a solids content of ≤70% by weight; and
   b) calcination of the reaction product, wherein the calcination is conducted by means of flame spray pyrolysis at an adiabatic combustion temperature within a range of 450-2200° C., wherein the suspension having a solids content of ≤70% by weight which is obtained in step a) is sprayed into a flame generated by combustion of a fuel in the presence of oxygen to form a pulverulent, porous crystalline metal silicate.

2. The process of claim 1, wherein the porous crystalline metal silicate has a zeolite structure.

3. The process of claim 1, wherein the porous crystalline metal silicate has a zeolite structure having a crystal structure of the LTA, MFI, FAU, MOR, MEL or MWW type.

4. The process of claim 3, wherein the metal source is a source of elements selected from the group consisting of titanium (Ti), aluminium (Al), zirconium (Zr), iron (Fe), tin (Sn), germanium (Ge), indium (In) and boron (B).

5. The process of claim 4, wherein the fuel is selected from the group consisting of:
   hydrogen; methane; ethane, propane; butane, natural gas; and mixtures thereof.

6. The process of claim 4, wherein the aqueous mixture in step a) additionally comprises a template selected from the group consisting of amines, quaternary ammonium compounds, alcohols and mixtures thereof.

7. The process of claim 4, wherein, in step a), component (A) and component (B) are present together in one substance and this substance is selected from the group consisting of: amorphous mixed metal-silicon oxide, amorphous silicon dioxide doped with metal oxide, amorphous silicon dioxide impregnated with metal, metal silicate, metal-doped tetraalkyl orthosilicate and mixtures thereof.

8. The process of claim 4, wherein step b) is followed by a shaping c) comprising the steps of:
   (a) adding water to obtain an aqueous suspension of the pulverulent, porous crystalline metal silicate;
   (b) mixing the suspension from step (a) with granulating aids;
   (c) compacting, granulating, spray-drying, spray granulating or extruding to obtain a porous crystalline metal silicate in the form of microgranules, spheres, tablets, solid cylinders, hollow cylinders or honeycombs.

9. The process of claim 1, wherein the fuel is selected from the group consisting of:
   hydrogen, methane, ethane, propane, butane, natural gas and mixtures thereof.

10. The process of claim 1, wherein the mean residence time of the suspension obtained in step a) in the conversion thereof in step b) is within a range from 0.1 to 10 s.

11. The process of claim 1, wherein the ignition loss according to DIN 18128:2002-12 of the porous crystalline metal silicate is less than 5% by weight.

12. The process of claim 1, wherein the aqueous mixture in step a) additionally comprises suitable seed crystals.

13. The process of claim 1, wherein the aqueous mixture in step a) additionally comprises a template selected from the group consisting of amines, quaternary ammonium compounds, alcohols and mixtures thereof.

14. The process of claim 1, wherein step a) is conducted at a temperature of 100 to 250° C. under the autogenous pressure generated in a pressure-resistant reactor.

15. The process of claim 1, wherein, in step a), component (A) and component (B) are present together in one substance and this substance is selected from the group consisting of: amorphous mixed metal-silicon oxide; amorphous silicon dioxide doped with metal oxide; amorphous silicon dioxide impregnated with metal; metal silicate; metal-doped tetraalkyl orthosilicate; and mixtures thereof.

16. The process of claim 15, wherein component (A) is an amorphous silicon dioxide doped with metal oxide, an amorphous silicon dioxide impregnated with metal, or an amorphous mixed metal-silicon oxide.

17. The process of claim 1, wherein, in step a), component (A) is in solid form and component (B) is in liquid form.

18. The process of claim 17, wherein component (A) is selected from the group consisting of: pyrogenic silicon dioxide; precipitated silicon dioxide; silicon dioxide produced by a sol-gel process; and mixtures thereof.

19. The process of claim 18, wherein component (A) is a high-purity silicon dioxide prepared by precipitation or a pyrogenic silicon dioxide.

20. The process of claim 1, wherein step b) is followed by a shaping c) comprising the steps of:
  (a) adding water to obtain an aqueous suspension of the pulverulent, porous crystalline metal silicate;
  (b) mixing the suspension from step (a) with granulating aids;
  (c) compacting, granulating, spray-drying, spray granulating or extruding to obtain a porous crystalline metal silicate in the form of microgranules, spheres, tablets, solid cylinders, hollow cylinders or honeycombs.

* * * * *